US007036686B2

(12) United States Patent
Newton

(10) Patent No.: US 7,036,686 B2
(45) Date of Patent: May 2, 2006

(54) SOFT DRINK DISPENSING SYSTEM

(75) Inventor: John R. Newton, Sebastian, FL (US)

(73) Assignee: Global Agricultural Technology and Engineering, LLC, Vero Beach, FL (US)

( * ) Notice: Subject to any disclaimer, the term of this patent is extended or adjusted under 35 U.S.C. 154(b) by 282 days.

(21) Appl. No.: 10/756,725

(22) Filed: Jan. 13, 2004

(65) Prior Publication Data

US 2004/0144802 A1 Jul. 29, 2004

Related U.S. Application Data

(60) Provisional application No. 60/440,980, filed on Jan. 18, 2003, provisional application No. 60/449,949, filed on Feb. 25, 2003.

(51) Int. Cl.

| | |
|---|---|
| ***B67D 5/56*** | (2006.01) |
| ***A47J 31/40*** | (2006.01) |
| ***A47J 31/00*** | (2006.01) |

(52) U.S. Cl. ............................... 222/129.1; 222/145.5; 222/145.6; 222/145.7; 137/7; 137/111

(58) Field of Classification Search ............. 222/129.1, 222/129.2, 129.3, 129.4, 145.1, 145.5, 145.6, 222/145.7, 146.6; 137/3, 7, 111

See application file for complete search history.

(56) References Cited

U.S. PATENT DOCUMENTS

| | | | | |
|---|---|---|---|---|
| 2,277,314 | A * | 3/1942 | Gallagher | 236/12.23 |
| 3,067,987 | A * | 12/1962 | Ballou et al. | 366/160.3 |
| 4,019,652 | A * | 4/1977 | Suh et al. | 222/1 |
| 5,642,761 | A | 7/1997 | Holbrook | |
| 5,841,027 | A | 11/1998 | Scarffe | |
| 6,045,007 | A * | 4/2000 | Simmons | 222/146.6 |
| 6,269,973 | B1 * | 8/2001 | Bennett et al. | 222/1 |
| 2002/0008163 | A1 | 1/2002 | Simmons | |
| 2002/0092866 | A1 | 7/2002 | Newman et al. | |

FOREIGN PATENT DOCUMENTS

| | | |
|---|---|---|
| EP | 0530858 | 3/1993 |

* cited by examiner

*Primary Examiner*—Michael Mar
*Assistant Examiner*—Stephanie E. Tyler
(74) *Attorney, Agent, or Firm*—Gauthier & Connors LLP

(57) ABSTRACT

A system for dispensing and mixing metered amounts of first and second liquid components of a soft drink. The system comprises a mixing chamber connected by separate feed conduits to pressurized sources of the first and second liquid components. First normally closed valves are located in and demarcate the feed conduits into upstream and downstream sections. The first valves are opened automatically in response to pressure above a threshold level in their respective upstream conduit sections, and are operative when open to deliver a constant flow of liquid through their respective downstream conduit sections to the mixing chamber. Second normally closed valves are located in the upstream conduit sections. The second valves are opened in response to a command signal, and each second valve automatically closes in response to a drop in pressure below the threshold level in the upstream conduit section of the other second valve.

4 Claims, 1 Drawing Sheet

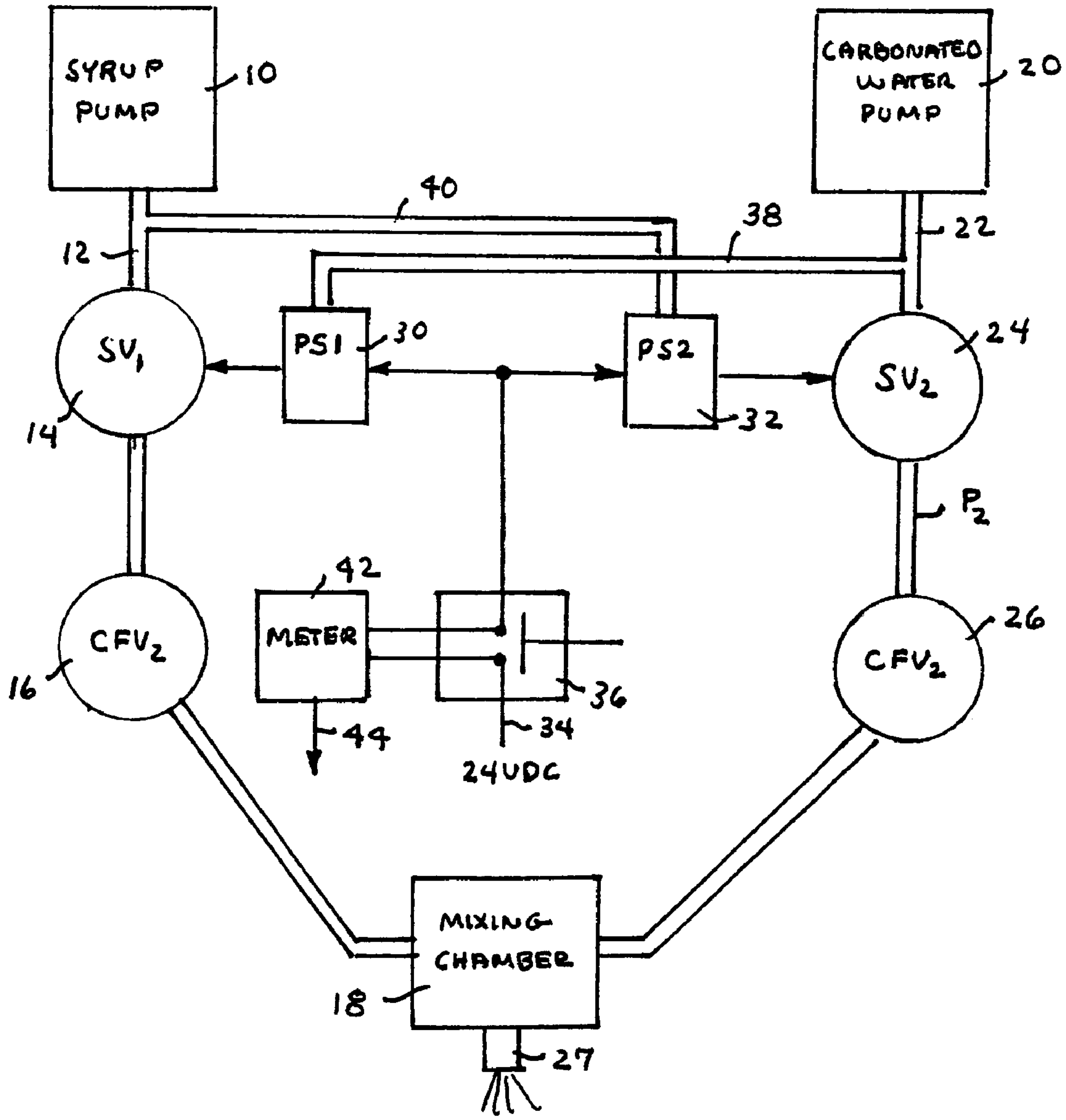
SYRUP PUMP
10
CARBONATED WATER PUMP
20
40
38
12
22
SV1
PS1
30
PS2
SV2
24
14
32
P2
42
METER
CFV2
16
26
36
44
34
24VDC
MIXING CHAMBER
18
27

SOFT DRINK DISPENSING SYSTEM

CROSS REFERENCE TO RELATED APPLICATIONS

This application claims priority of provisional patent application Nos. 60/440,980 and 60/449,949 filed respectively on Jan. 18, 2003 and Feb. 25, 2003.

BACKGROUND DISCUSSION

1. Field of the Invention

This invention relates generally to soft drink dispensers, and is concerned in particular with an improved system for consistently delivering metered amounts of soft drink ingredients, e.g., flavored syrups and carbonated water.

2. Description of the Prior Art

Known delivery systems for soft drink dispensers are mechanically complex and not only expensive to purchase but also prone to frequent breakdown, thus requiring frequent and expensive maintenance. Known delivery systems also malfunction when the supply of one of the drink components is interrupted. Thus, for example, when mixing syrup and carbonated water, if the syrup supply is depleted and not refilled in a timely manner, the system will continue to deliver only carbonated water.

An object of the present invention is to provide a soft drink dispensing system that is simple and inexpensive in design, and capable of consistent and reliable operation without requiring frequent maintenance.

A companion objective of the present invention is the provision of a dispensing system that will automatically interrupt the supply of one liquid component if the supply of the other liquid component is interrupted for any reason, e.g., a drop in pressure below a threshold level.

Still another objective of the present invention is the provision of a dispensing system capable of accurately monitoring the volume of each liquid being dispensed.

SUMMARY OF THE INVENTION

A system in accordance with the present invention, includes pumps or other equivalent means for delivering first and second liquid components of a soft drink under pressure and via separate feed conduits to a mixing chamber or the like. First normally closed valves are located in and demarcate the feed conduits into upstream and downstream sections. The first valves are opened automatically in response to pressure above a threshold level in their respective upstream conduit sections, and are operative when open to deliver a constant flow of liquid through their respective downstream conduit sections to the mixing chamber.

Second normally closed valves are located in the upstream conduit sections. Control components open the second valves in response to a command signal, and automatically close each second valve in response to a drop in pressure below the threshold level in the upstream conduit section of the other second valve.

These and other features and attendant advantages will now be described in greater detail with reference to the accompanying drawing, wherein:

BRIEF DESCRIPTION OF THE DRAWING

The single FIGURE is a schematic illustration of a system in accordance with the present invention.

DETAILED DESCRIPTION OF PREFERRED EMBODIMENT

In accordance with the present invention, as depicted on the attached drawing, a syrup pump 10 delivers a first soft drink component, e.g., flavored syrup, via feed line 12 and through valves 14, 16 to a mixing chamber 18. A carbonated water pump 20 delivers carbonated water via a second separate feed line 22 and through valves 24 and 26 to the mixing chamber 18. The syrup and carbonated water are mixed in chamber 18 for delivery via outlet 28 to an underlying cup or the like (not shown).

Valves 14 and 24 are of the normally closed on/off solenoid-operated type. Valves 16 and 26 are of the normally closed constant flow type described, for example, in U.S. Pat. Nos. 6,026,850 and 6,209,578, the descriptions of which are herein incorporated by reference.

Pressure switches 30, 32 are connected to a power source 34 via a normally open manually operable push button control switch 36.

Switch 30 is connected to solenoid valve 14 and is arranged to sense the pressure $P_2$ in feed line 22 via branch line 38. Similarly, switch 32 is connected to solenoid valve 24 and is arranged to sense the pressure $P_1$ in feed line 12 via branch line 40.

The pressure switches 30, 32 are normally open, and are closed by closure of switch 36 to thereby communicate an "open" command signal to the valves 14, 24. With the valves 14, 24 open, the line pressures P1, P2 from pumps 10, 20 are delivered to valves 16, 26, and assuming that those pressures are above preselected threshold levels, valves 16, 26 open and deliver constant volume liquid flow to the mixing chamber 18. Should the pressures $P_1$, $P_2$ vary while remaining above the threshold levels, the valves 16, 18 will operate to insure a constant flow to the mixing chamber 18.

In the event, for example, that the supply of syrup from pump 10 is interrupted, and the pressure $P_1$ drops below the threshold pressure assigned to feed line 12, the valve 16 will automatically shut. At the same time, the same drop in pressure will be sensed by switch 32 via branch line 40, causing switch 32 to open automatically, and causing solenoid valve 24 to also shut.

A similar sequence will operate in response to a drop in the pressure $P_2$ below its assigned threshold level, namely, valve 26 will automatically shut, and pressure switch 30 will open automatically to close solenoid valve 14.

With this arrangement, the mixing chamber 18 will always receive syrup and carbonated water in the proper ratio, and a supply interruption of one drink ingredient will automatically trigger an interruption in the supply of the other.

A meter 42 may be connected to the switch 36 to record the time of activation of the pumps 10, 20. Meter 42 can have a LCD readout, and can also operate via a telemetric connection 44 to transmit data to a central computer. The time of pump activation coupled with the constant flow through valves 16, 26 makes it possible to accurately monitor syrup and/or carbonated water consumption at each dispensing station.

As herein employed, the term "soft drink" is intended to encompass both carbonated and non-carbonated beverages. Thus, those skilled in the art will understand that the present invention may be employed in all beverage dispensing applications where a liquid flavoring agent or the like is being mixed with a liquid diluent.

I claim:

1. A system for dispensing and mixing metered amounts of first and second liquid components of a soft drink, said system comprising:

a mixing chamber;

means for delivering said first and second liquid components under pressure and via separate conduits to said mixing chamber;

first normally closed valves located in and demarcating said conduits into upstream and downstream sections, said first valves being opened automatically in response to pressure above a threshold level in their respective upstream conduit sections, and being operative when open to deliver a constant flow of liquid through their respective downstream conduit sections to said mixing chamber;

second normally closed valves in said upstream conduit sections; and control means for opening said second valves in response to a command signal, and for automatically closing each second valve in response to a drop in pressure below said threshold level in the upstream conduit section of the other second valve.

2. The system of claim 1 wherein said command signal is generated by closure of a control switch.

3. The system of claim 2 wherein said command signal is applied to each of said second valves via an associated pressure switch, each pressure switch being operative to interrupt the command signal to its respective second valve in response to a drop in pressure below said threshold level in the upstream conduit section of the other second valve.

4. The system of claim 2 or 3 further comprising means for recording the elapsed time during which said control switch is closed.

* * * * *